(No Model.) 4 Sheets—Sheet 3.
A. H. CHAPMAN.
MACHINE FOR CUTTING BONES.

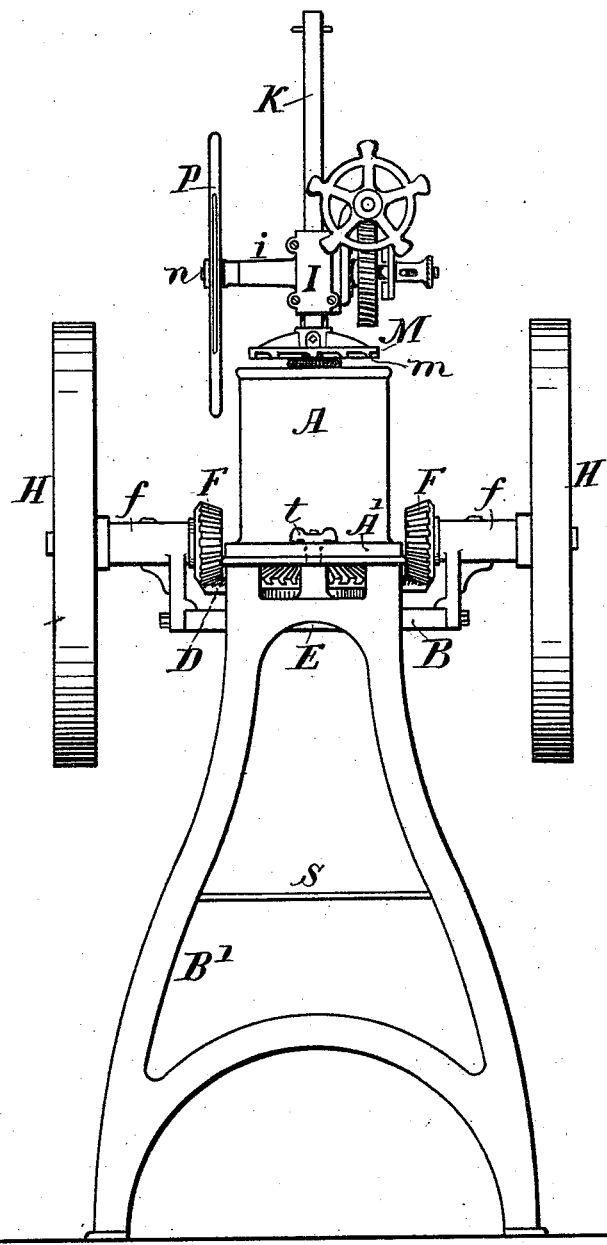

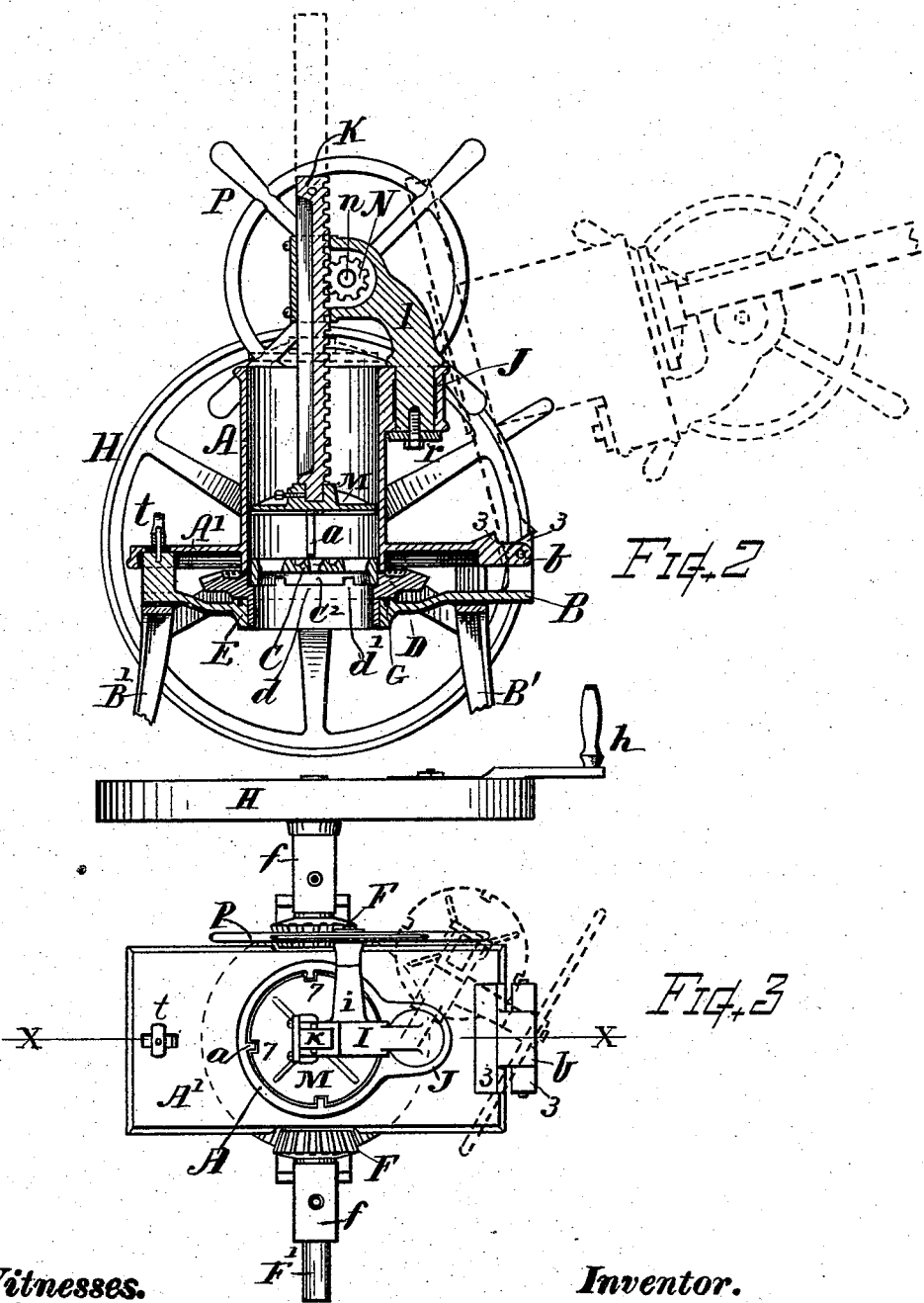

No. 527,769. Patented Oct. 23, 1894.

Witnesses.
Simeon E. King.
Ella P. Blenus.

Inventor.
Albert H. Chapman
By Chas. H. Burleigh
Attorney (No Model.) 4 Sheets—Sheet 4.
A. H. CHAPMAN.
MACHINE FOR CUTTING BONES.

No. 527,769. Patented Oct. 23, 1894.

Witnesses. Inventor.
Simon E King Albert H. Chapman
Ella P. Blenus By Chas. H. Burleigh
Attorney

UNITED STATES PATENT OFFICE.

ALBERT H. CHAPMAN, OF UPTON, MASSACHUSETTS.

MACHINE FOR CUTTING BONES.

SPECIFICATION forming part of Letters Patent No. 527,769, dated October 23, 1894.

Application filed September 1, 1893. Serial No. 484,587. (No model.)

*To all whom it may concern:*

Be it known that I, ALBERT H. CHAPMAN, a citizen of the United States, residing at Upton, in the county of Worcester and State of Massachusetts, have invented a new and useful Machine for Cutting Bones, of which the following, together with the accompanying drawings, is a specification sufficiently full, clear, and exact to enable persons skilled in the art to which this invention appertains to make and use the same.

This invention relates to the construction and organization of mechanism in a machine for cutting or comminuting green bones for poultry food, and for similar purposes; the object of my present invention being to produce a simple and more convenient and efficient mechanism for the purposes named; which can be operated with comparative ease, either by power or hand, and maintained in proper condition for use with little attention, labor and expense; also, to provide a cutter of peculiar construction and adaptation for the work, and to combine said cutter with its operating mechanism in a manner that will permit of its ready removal for sharpening or cleaning.

Another object is to provide a presser operating mechanism of peculiar construction for forcing the material upon the cutter, to combine the parts and gearing of said mechanism in a manner to give a more advantageous, powerful and desirable feed action; and to mount the same in connection with the cylindrical hopper in a way that affords elevation and tilting thereof together with the elevation or tilting of the cylinder, and also permits the presser and its operating mechanism to swing laterally out of the way, without detachment of parts, to facilitate charging the uncut materials into the hopper.

These objects I attain by mechanism, constructed and operating as explained in the following description; the particular subject-matter of my invention being hereinafter definitely specified in the claims.

Figure 4:
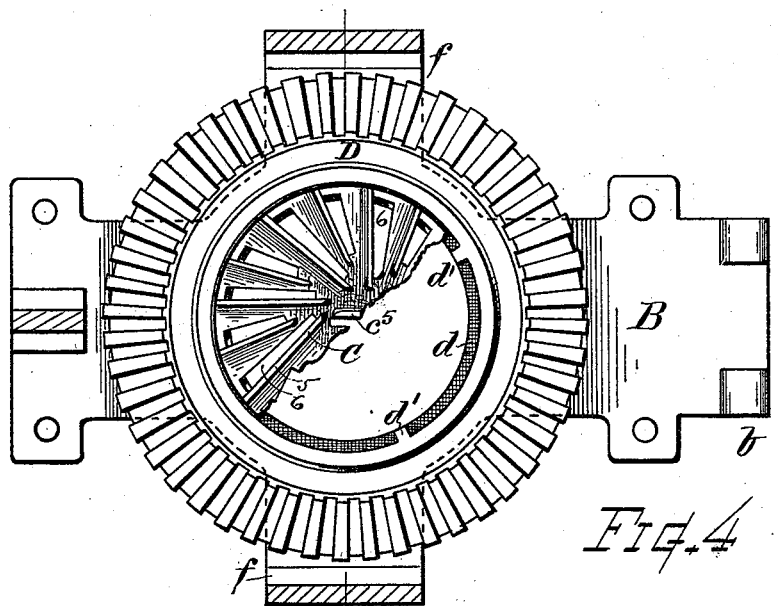
Figures 5, 6:
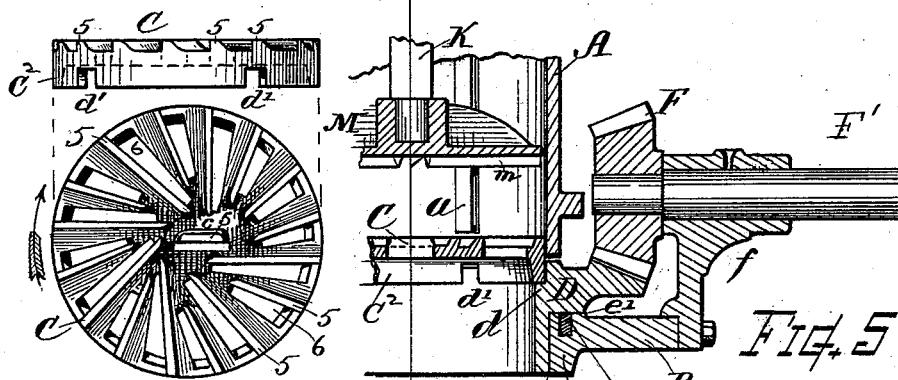
Figure 7:
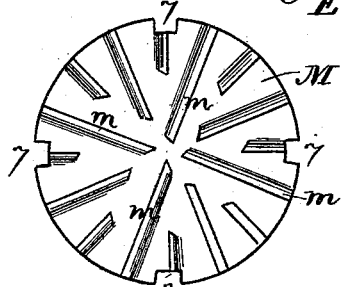
Figure 8:
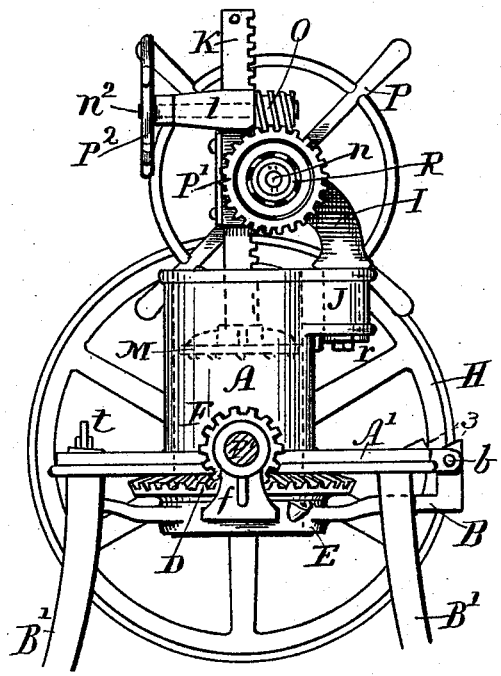
Figure 9:
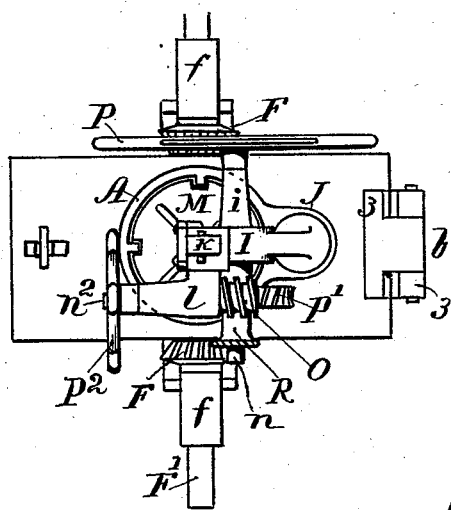

In the drawings, Figure 1 is a front view. Fig. 2 is a vertical central section at line $x\,x$ Fig. 3. Fig. 3 is a plan view. Fig. 4 is a horizontal section showing, on a somewhat larger scale, the cutter-bed and a portion of the cutter and bed-frame. Fig. 5 is a vertical section through one side of the mechanism at the cutter-bed bearing. Fig. 6 shows a top and side view of the cutter. Fig. 7 is a bottom view of the presser-plate. Fig. 8 is a side view showing the machine provided with a worm and worm-wheel devices for operating the feed-presser, and Fig. 9 is a plan view showing said worm mechanism, the fly-wheels being omitted.

My improved bone-cutting machine comprises an upright cylindrical hopper, at the bottom of which there is a rotatable cutter of peculiar construction supported at its peripheral rim upon an annular horizontal revoluble cutter-bed that runs in a ring bearing on the bed-frame, and is provided with gear-teeth into which are meshed the teeth of a beveled pinion (or pinions) fixed on an operating shaft (or shafts) mounted in a suitable bearing fixed to the bed-frame; which shaft is provided with a fly wheel and crank, or a hand-wheel, gear or suitable means for imparting power and motion to the machine. The cylinder or feed receptacle is supported above the cutter, preferably by a plate or frame that is hinged at its rear end to the bed-frame so that the cylinder can be swung upward and backward for releasing the cutter, and giving access to the cutter-bed and parts beneath. The cylinder has upon its exterior a bearing in which is supported a laterally swinging crane that projects upward and forward over the cylinder and forms a guide and support for the vertically moving rack that carries the presser-plate, and for a pinion and hand-wheel mechanism for operating said presser.

In accordance with my invention the several parts of this mechanism are constructed and organized in the manner hereinafter more particularly described.

Referring to parts, A denotes the cylinder consisting of an upright shell open at both its upper and lower ends, and provided on its interior with inwardly projecting longitudinal ribs $a$. The cylinder is cast integral with, or attached to, a horizontal plate or frame A', the rear end of which is preferably hinged, as at $b$, to the bed-frame B, which latter is supported on suitable legs B' that sustain the mechanism at proper heights from the floor.

C indicates the cutter which is of circular form of substantially the same diameter as the interior of the cylinder, and located with its working face within the lower end thereof. Said cutter is supported upon a ledge $d$ within the central opening of the annular plate or cutter-bed D, which is furnished with gear teeth at its outer edge, and is mounted to revolve in a bearing ring E formed in the bed-frame B; the cutter-bed and the cylinder being axially coincident with each other. The supporting ledge $d$ and the cutter-rim are fitted with intermatching lugs and recesses, as $d'$, which cause the cutter to rotate with the cutter-bed D.

The cutter consists of an integral perforated circular disk (see Fig. 6) having on its upper surface a series of projecting sharp-edged teeth or ribs 5 that are disposed in approximately radiating order, but on lines that radiate from different points eccentric to the axis of the disk. Perforations 6 are formed through the plate in front of the cutting edges, as illustrated, to allow the cut bone to pass through. The principal cutting ribs do not meet at the center of the disk, but a transversely disposed cutting tooth or rib $c^5$ is arranged with its edge at or upon the axis, as shown, which serves to cut away the bone at the axis of rotation. The working faces of the cutters are approximately in the same plane, and the edges can be readily sharpened by taking the disk from the machine and grinding off the tops of the projecting ribs; which can be done by any person and upon any ordinary grindstone. At the periphery the cutter-disk is best provided with a downwardly extended rim $C^2$ for resting upon the ledge $d$, and in said rim are formed the retaining recesses at $d'$. The cutter simply rests upon the supporting ledge $d$ within the circle of the geared-bed D, without being otherwise fastened thereto, and can readily be lifted out and replaced when the cylinder is swung backward, as indicated by dotted lines Fig. 2.

The bearing ring E on the bed-frame B is formed with a cylindrical bearing surface $e$ for the downwardly extended tubular portion of the cutter-bed, and with a flat bearing surface $e'$ that supports the cutter-bed and mechanism thereon. This flat bearing is best provided with an annular groove having a filling of felt therein, as indicated at G (see Fig. 5) for containing oil; thereby insuring proper lubrication of the bearings. The opening through the cutter-bed is approximately the same in diameter as the interior of the cylinder A less the width of the cutter-supporting ledge $d$, thus affording ample space for the discharge of the cut bone which can drop directly from the cutting disk into a suitable receptacle placed beneath the central opening on the shelf S.

The cylinder frame A' and the bed-piece B are best provided or formed at their hinges with protuberant portions or stops 3 that rest against each other and sustain the cylinder and parts connected therewith from falling backward when in its raised position. The front end of the plate A' is retained when the cylinder is in working position by means of a suitable latch or holding device at $t$.

The operating shaft F' is mounted in a bearing $f$ attached to the bed frame at the side of the machine. Said shaft carries a bevel pinion F that meshes with the teeth on the upper side of the cutter-bed, and is provided at its outer end with a wheel H and crank $h$, or means for imparting power and motion to the mechanism. In the present instance the machine is shown with an operating shaft and pinion at each side, but in any instance desired one shaft may be employed, the other being omitted.

I indicates a crane or goose-neck having its lower end journaled in an upright position within a bearing J formed on the exterior of the cylinder A. The head of the crane I is provided with an upright guide-way through which is arranged the rack K, carrying at its lower end the presser-plate M. A pinion N is mounted within the hollow of the crane-head meshing with the toothed rack, and its shaft $n$ projects through a bearing $i$ at the side of the crane-head, and has on its outer end a hand-wheel or lever-head P by which said pinion can be readily operated for reciprocating the rack and presser-plate as desired. When the presser-plate is raised above the top of the cylinder the crane I and parts supported thereby can be swung laterally to one side, as indicated by dotted lines in Fig. 3, thus leaving the top of the cylinder free and open to facilitate charging or cleaning the interior. The crane I is retained in its bearing J by an overlapping washer $r$ secured to the lower end of the journal, as in Fig. 2. If desired said washer may be notched at one side and a stop lug engaged therewith for limiting the lateral swing of the crane I.

The presser-plate is fitted with notches 7 at its edges that engage with the ribs $a$ on the interior of the cylinder, and its under surface is furnished with a series of angular ribs $m$, the sharp edges of which are directed in a manner to retain the bones in opposition to the force and direction of the cutting devices.

For power-driven machines, or in any instance wherein a steady and powerful downward action of the feed-presser M is desired, the machine is best provided with a worm O, worm-wheel P' and actuating devices such as illustrated in Figs. 1, 8 and 9. The shaft $n$ extends at the right of the pinion N and crane-head I, and the worm-wheel P' is arranged loose on said shaft with a disengageable clutch R, adjacent thereto, which can be operated by a suitable hand-knob at its outer end, for clutching and unclutching said worm-wheel in its relation with the pinion-shaft $n$. The worm O which meshes with the wheel P' for operating it, is arranged upon an arbor or shaft $n^2$ mounted to turn in a bearing $l$ supported upon the crane-head I, and having at its front end a lever-head or hand-wheel P² by which the mechanism can be conveniently actuated by the operator for depressing the feed-presser M with a powerful action when the clutch R is engaged. Then when the clutch is thrown off the worm-wheel is released from the shaft $n$ and a quick return or lift of the presser can be effected by the wheel P. The clutch R is fitted to engage with teeth on the worm-wheel when moved up to the same, and to be disengaged by moving it outward along the shaft, which can be easily done by taking hold of its outer end.

In Fig. 3 the machine is illustrated as made without the worm-screw feed-operating devices; while Fig. 9 shows a somewhat similar view of the machine with said worm-screw feed employed therein.

In the operation, the bone or material to be cut is placed in the cylinder A. The crane I is swung forward bringing the presser mechanism into position over the same with its notches 7 in line with the internal ribs $a$. The presser is then depressed, by means of its rack K, pinion N and hand-wheel, P² forcing the bones upon the cutter-disk C which is rotated with the cutter-bed gear by the pinion, operating shaft and wheel. The cutter operates across the entire interior area of the cylinder-end cutting the bone at whatever position it may be presented, and delivering the cut or comminuted material directly downward as fast as produced, and simultaneously working over the whole face of the cutter-disk; while the operator with his hand on the wheel P², or lever P, can move the presser M so as to regulate the force of the feed as he may desire. The bones being held by the sharp angular ribs of the presser-plate, in opposition to the cutting ribs of the cutter-disk, are maintained in position and forced upon the cutting edges in a manner that insures rapid and easy disintegration of their substance.

With a cutter of the construction and nature above described there are no detachable blades to require frequent adjustment; and no liability of cutters becoming loose or displaced. The entire working face being of cutting angles, the material to be cut rests only upon the sharp cutting edges, and is not supported upon a flat portion of plate as in previous practice. Hence it offers no friction and resistance to the operating power of the machine other than that required for the actual cutting of the bone or material. This is a feature of importance and utility in the working of the mechanism. This style of cutter also acts to comminute the bone into fine granules or "scrapings" rather than into coarse chips.

By constructing and arranging the cutter-bed and the ring bearing in the manner shown, the bone or material comes into contact only with the interior tubular opening of the cutter-bed, and the bearing joint is protected so that the fine bone chips cannot get between the bearing surfaces $e\ e'$ and thereby clog the mechanism or interfere with the free running of the parts. This feature is of much importance in machines for the purpose named.

The tipping of the cylinder greatly facilitates the removal, from the cutter, of shreds of tough fiber and tendons, which do not become cut with the bone, but are drawn out by the cutters and accumulate above them.

The employment, in a cutting machine, of a revolubly geared plate, carrying diversely arranged cutters attached thereto, in combination with a cylindrical hopper or feed receptacle, is a feature that, in different constructions, has long been public and well known. It will therefore be understood that I do not include such feature, broadly, as of my invention; but that my claims refer to specific construction and arrangement substantially such as defined.

What I claim as of my invention, and desire to secure by Letters Patent, is—

1. The hopper-cylinder having a rigidly attached support-plate, said support-plate hinged at one end to the bed-frame to swing upward and backward, the hinged parts provided with engaging stops, as set forth, a locking device for retaining said plate and cylinder down in working position, and a feed-forcing presser-mechanism attached to said cylinder; in combination with the bed-frame carrying the hinge-ear, the annular geared cutter-bed revoluble in a ring-bearing on said bed-frame, and having a central opening with an annular ledge, and the cutter-disk supported on said ledge with its top projecting upward within and surrounded by the lower end of said cylinder, all substantially as set forth.

2. The laterally swinging crane having its lower end journaled in a bearing formed upon the feed-cylinder top, the vertically sliding toothed rack guided within the crane-head, and carrying the presser-plate, the pinion N having a shaft $n$ supported in a bearing $i$ on the crane-head, and the hand-wheel P fixed on said shaft, for operating said pinion and rack, in combination with the feed-cylinder, and cutting mechanism at the bottom of said cylinder, as set forth.

3. The cutter for the purpose specified, formed in a single piece consisting of a disk provided upon its face with a series of integral upwardly projecting ribs with sharp angular edges, and having slots or openings through the disk at the front of said ribs, and a peripheral rim provided with lugs or notches for sustaining said cutter in rotative action, as set forth.

4. In a machine for cutting bones, the bed-frame having the ring-bearing fitted with vertical and horizontal bearing surfaces $e\ e'$ the latter having an annular groove and packing G therein, and the annular rotatable cutter-bed having the central opening and downwardly extended tubular portion fitted with exterior bearing surfaces corresponding to said ring-bearing, supported on and covering the same, in combination with the cutter supported on said cutter-bed, the feed cylinder, presser mechanism, and means for operating said cutter bed.

5. In a machine for cutting bones, in combination substantially as described, the revoluble cutter-bed, the cutters, the hopper cylinder having the upright bearing formed on its exterior, the laterally swinging crane journaled in said bearing and having a hollow head with upright guide-way, a lateral, and a forwardly projecting bearing-hub thereon, the reciprocating feed-presser and its rack supported in said guide-way, the pinion meshing therewith within the crane-head, the pinion-shaft extending through said lateral bearing hub, the worm-wheel mounted on said shaft, the worm-screw operating said worm-wheel, and the hand-wheel on the worm-screw-arbor, for the purposes set forth.

6. A bone-cutting-machine, comprising, in combination substantially as described, the supporting-bed, the revoluble cutter-bed carrying a cutter, the hopper-cylinder surmounting the bed and cutting devices, and having the upright bearing formed on its rim, the laterally swinging crane journaled in said bearing, its chambered head provided with a vertical guide-way and projecting bearing-sleeves, the feed-presser non-rotatably confined within said hopper-cylinder, the reciprocating rack carrying said feed-presser mounted in said guide-way, the pinion-shaft mounted in the projecting bearing and carrying the presser-actuating pinion fixed thereon, the hand-lever-wheel fixed on the outer end of said shaft, the worm-wheel mounted loose on said shaft with the knob-handled engaging-clutch connecting the shaft and worm-wheel, the worm-screw meshing with said worm-wheel, and the hand-operating-wheel fixed on the front end of the worm-arbor, for the purposes set forth.

7. In a bone-cutting machine, a feed-hopper having an upright bearing formed upon the exterior of its cylindrical rim, and the overhanging crane having its standard end journaled within said bearing, as set forth, in combination with feed-forcing appliances carried on said crane, and the cutting mechanism beneath said hopper.

Witness my hand this 19th day of August, A. D. 1893.

ALBERT H. CHAPMAN.

Witnesses:
CHAS. H. BURLEIGH,
ELLA P. BLENUS.